April 28, 1970 L. C. LEVENTHAL 3,509,288
AMBIENT LIGHT TRIGGERED MESSAGE-REPEATER
SYSTEM WITH ELECTRONIC SWITCHING
Filed April 12, 1968 2 Sheets-Sheet 1
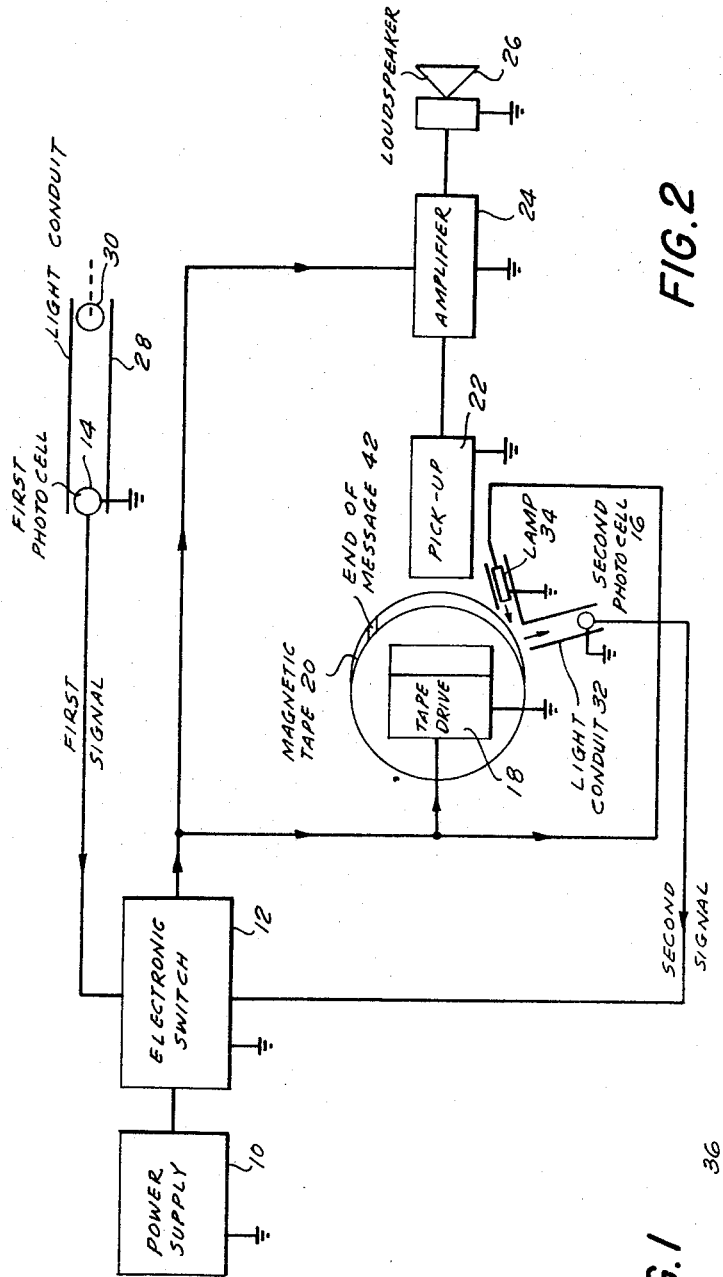
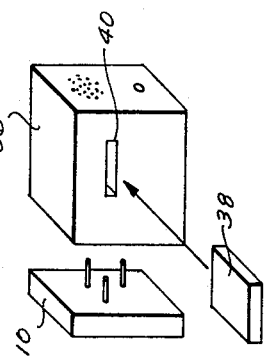
INVENTOR
LEON C. LEVENTHAL
BY Theodore Jay
ATTORNEY

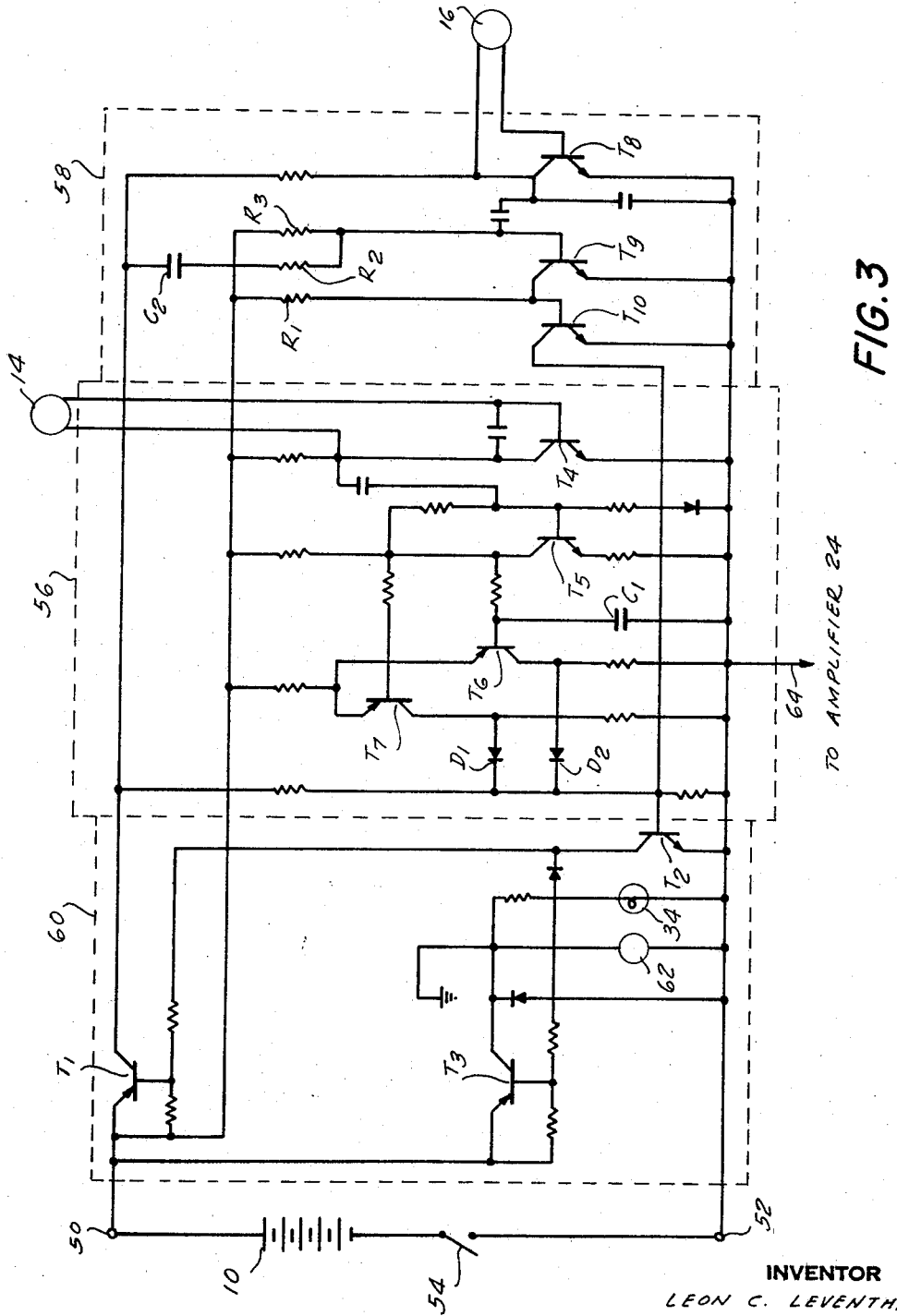

United States Patent Office 3,509,288
Patented Apr. 28, 1970

3,509,288
AMBIENT LIGHT TRIGGERED MESSAGE-REPEATER SYSTEM WITH ELECTRONIC SWITCHING
Leon C. Leventhal, 245 E. 63rd St.,
New York, N.Y. 10021
Filed Apr. 12, 1968, Ser. No. 720,801
Int. Cl. G11b *15/08;* G08b *13/18;* H01j *39/12*
U.S. Cl. 179—100.1                                4 Claims

ABSTRACT OF THE DISCLOSURE

Apparatus for reproducing, in oral form, a message prerecorded on magnetic tape. The apparatus, which is portable and compact as well as being self-powered by replaceable or rechargeable batteries, photoelectrically senses the presence of one or more individuals, and, when such individuals approach, turns itself on to deliver a total message which can be composed of one or more individual messages. After the total message has been delivered, the apparatus senses the end-of-message condition and turns itself off. Typically, the apparatus is utilized anywhere a product is displayed for sale and, whenever anyone passes within a preselected maximum distance, the message, in the form of a dynamic sales "pitch" is delivered and can create a strong impulse to the listener to buy the product.

Summary of the invention

In accordance with the principles of my invention, my apparatus utilizes first photoelectric means to produce a first electric signal when an individual passes by.

A device for reproducing the message in oral form can include a magnetic tape carrying the message, a magnetic pick-up head, a mechanism for feeding the tape past the head, a loudspeaker and an amplifier coupled between the head and the loudspeaker.

Seconds means, responsive to the motion of the tape past the head, produces a second electrical signal when the message has been completely reproduced.

An electronic switch is coupled between the first and second means and the device. The switch has first and second mutually exclusive electric states; it is placed in the first state upon receipt of the first signal and is placed in the second state upon receipt of the second signal. The switch, once in either state, remains in that state until it receives a signal which changes this state.

When the switch is placed in the first state, it turns the device on to deliver the message. When the message is complete, the switch is placed in the second state and turns the device off.

If desired, time delay means can be incorporated into the apparatus to incorporate a minimum time period, varied as required, between the instant the device has been turned off after completion of a message and the instant the device is again turned on to again deliver the message. This delay means can be used to prevent too rapid repetition of the message, which might adversely influence the effect of the sales presentation.

Brief description of the drawings

In the drawings:
FIG. 1 is a perspective view of my apparatus:
FIG. 2 is a block diagram thereof; and
FIG. 3 is a circuit diagram of certain portions of my apparatus.

Detailed description of preferred embodiment

Referring first to FIGS. 1 and 2, a battery powered supply 10 is adapted to supply operating power via an electronic switch 12 under the control of photoelectric cells 14 and 16 to a unit having a tape drive 18 rotating an endless belt of magnetic tape 20 containing a prerecorded message past a magnetic pick-up head 22. The head 22 is connected through an amplifier 24 to a loudspeaker 26. The first photocell 14 can be disposed in a cylindrical hollow light conduit 28 having an open end 30. The second photocell 16 can be disposed in one leg of an L-shaped light conduit 32, the other leg containing a light bulb or lamp 34.

The cells 14 and 16, conduits 28 and 32, switch 12, drive 18, head 22, amplifier 24 and loudspeaker 26 can all be disposed in a case or housing 36 detachably receiving a rechargeable plug-in supply 10. The tape 20 can be disposed in a plug in cartridge 38 insertable into housing 36 via slot 40.

In operation, ambient light passes along conduit 28 and strikes photocell 14. When a person walks past end 30 within a preselected maximum distance, such as ten feet, the intensity of light striking cell 14 changes rapidly, either being decreased, for example, because the person wears dark clothes or being increased, for example, because the person is wearing bright, light reflecting clothes. In either case, a first electrical signal is generated and is supplied to the electronic switch 12 to place same in a first electric state in which power is supplied to the remaining elements, i.e. drive 18, amplifier 24 and lamp 34. The tape is passed by the head whereby the message thereon is amplified and reproduced in oral form in the loudspeaker.

Light emitted from lamp 34 is directed downward upon the moving tape and is reflected therefrom to impinge upon cell 16. The tape in the region 42 immediately adjacent the end of message position thereon is treated to have different light reflection properties than the remainder of the tape. As the end of message passes the tape head, light from the lamp 34 which strikes portion 42 and is reflected to cell 16, has sharply different properties of either increased intensity (if portion 42 is a mirror) or decreased intensity (if portion 42 is colored black), and a second electrical signal is generated and supplied to the switch. This places the switch in its second electric state in which power is no longer supplied to the drive 18, amplifier 24 and lamp 34.

In order to control the maximum number of times the message can be repeated in a selected interval of time, the apparatus can be modified to prevent the apparatus, once having been turned off or disabled, from being turned on or enabled again for a predetermined minimum interval such as thirty seconds. To this end, a time delay network can be inserted. Such a network is not shown in FIG. 2, but is shown in the circuit of FIG. 3 as discussed below.

Referring now to FIG. 3, the power supply 10 has two terminals 50 and 52. Terminal 52 is connected to the supply through a switch 54 which is normally open and is closed only when the tape cartridge is inserted into slot 40 in housing 36. This arrangement conserves battery power.

Terminals 50 and 52 are connected to the three main sections 56, 58 and 60 of the circuit. Section 56 is controlled by the first photocell 14, section 58 is controlled by the second photocell 16, and section 60 which is the electronic switch and typically can take the form of a Schmidt trigger, is controlled by sections 56 and 58.

Referring first to section 60, when the switch is in its second state, transistors T1 and T2 are non-conducting, transistors T3 is non-conducting, and no power is supplied to motor 62 (which operates the tape drive), or to lamp 34 or to lead 64 which goes to amplifier 24. The apparatus is then disabled and no message is reproduced.

When the switch is in its first state, transistors T1 and T2 are fully conductive, rendering transistor T3 fully conductive and power is supplied to motor 62, lamp 34 and lead 64, thus enabling the apparatus to reproduce the message.

Referring now to section 56, when cell 14 is exposed to slowly changing ambient light, transistors T4 and T5 are conducting and render transistors T6 and T7 (which form a differential amplifier) conductive. The output leads from these last two transistors are fed through diodes D1 and D2 (which have opposite polarities) to the input of transistor T2, holding same in the non-conductive state. When cell 14 receives a sharp change in light, as described previously, a transient or pulse is produced which is amplified in transistors T4 and T5. As a result, transistors T7 and T8 are activated unevenly due to a time delay determined by capacitor C1. The positive pulses from either one of these last named transistors then pass through diode D1 or diode D2, turning transistor T2 on. Transistor T2 turns transistor T1 on. The regeneration action between transistors T1 and T2 drives transistor T2 rapidly into saturation and thus switches transistor T3 into saturation, enabling the apparatus as described.

Referring now to section 58, when cell 16 is receiving reflected light from the tape while the message is being reproduced, transistor T8 is non-conducting, permitting transistor T9 to be fully saturated, thus holding transistor T10 in the non-conductive state. When the end of message reflection is received, cell 16 produces a second transient or pulse which drives transistor T8 into saturation, cutting transistor T9 off and causing transistor T10 to be conductive and saturate. Transistor T10 then delivers a pulse to transistor T2, and the regenerative action cuts transistors T1 and T2 off, cutting off transistor T3 and disabling the apparatus.

Capacitor C2 normally does not significantly influence operation of the circuit. However, once transistor T9 is cut off, it cannot return to its conductive state until capacitor C2 has discharged through the adjacent resistors R1, R2 and R3 and associated components. After discharge, transistor T9 returns to conduction cutting transistor T10 off and permitting section 56 to enable the apparatus again. During the discharging period, section 56 cannot trigger transistor T2 into conduction even if individuals pass by cell 14, and so the apparatus cannot be enabled during the time delay of capacitor discharge. The value of this capacitor can be changed to vary the length of the time delay.

While I have described my invention with particular reference to the drawings, many modifications with the scope and sphere of my invention, as defined in the claims below, will be apparent to those skilled in the art.

What is claimed is:

1. Apparatus for reproducing a prerecorded message comprising:
(a) first photoelectric means including a first single photocell disposed in a light conduit having an open end through which ambient light passes to impinge upon said first cell, the passage of an individual in any direction past said end causing the intensity of the impinging light to change rapidly, the intensity decreasing when the individual wears dark clothes and increasing when the individual wears bright light reflecting clothes, said first means producing a first electric signal when said light intensity changes occur;
(b) a device for reproducing said message in oral form, said device including a message tape carrying said message, a portion of the tape representing the end of the message having different light reflecting properties than the remainder of the tape, a pickup head, a mechanism for feeding said tape past said head, a loudspeaker and an amplifier;
(c) a light source for illuminating each portion of said tape in turn as each portion passes the head whereby light reflection is produced, said reflected light changing sharply in intensity when the end of message portion is illuminated;
a second photocell responsive to the light reflected by said tape to produce a second electric signal when the reflected light changes sharply in intensity; and
(d) an electronic switch connected between said first means, said second photocell and said device, said switch having a first electric state at which said device is enabled and the message is reproduced and having an alternative second state at which said device is disabled and no message is reproduced, said switch being placed in the first state upon reception of the first signal and being placed in said second state upon reception of the second signal.

2. Apparatus as set forth in claim 1 wherein said end of message tape portion is a mirror.

3. Apparatus as set forth in claim 1 wherein said end of message portion is colored black.

4. Apparatus as set forth in claim 1 wherein said device is provided with a time delay network to establish a selected minimum delay between the instant at which the device is disabled and the instant at which the device is subsequently enabled.

References Cited

UNITED STATES PATENTS

| | | |
|---|---|---|
| 2,152,296 | 3/1939 | Weis et al. |
| 2,595,993 | 5/1952 | Templeman et al. |
| 3,027,430 | 3/1963 | Gilman _____ 179—100.1 |
| 3,140,360 | 7/1964 | Whitworth _____ 179—100.2 |
| 3,329,946 | 7/1967 | Robbins _____ 340—258 |

TERRELL W. FEARS, Primary Examiner

R. F. CARDILLO, Jr., Assistant Examiner

U.S. Cl. X.R.

250—221; 340—221, 258